United States Patent [19]

Schug

[11] 4,414,631

[45] Nov. 8, 1983

[54] BRAKE CONTROL SYSTEM

[75] Inventor: Arden L. Schug, Torrance, Calif.

[73] Assignee: The Garrett Corporation, Los Angeles, Calif.

[21] Appl. No.: 256,363

[22] Filed: Apr. 22, 1981

[51] Int. Cl.³ .............................................. B60T 8/02
[52] U.S. Cl. .................................... 364/426; 303/93; 303/95
[58] Field of Search ................ 364/426; 303/100, 103, 303/106, 111, 95

[56] References Cited

U.S. PATENT DOCUMENTS 3,953,083  4/1976  Latvala et al. ..................... 303/21 P
3,993,362  11/1976  Kamins et al. ................. 303/21 BE
4,054,329  10/1977  Müller et al. ........................ 303/106

*Primary Examiner*—J. V. Truhe
*Assistant Examiner*—Saul M. Bergman
*Attorney, Agent, or Firm*—Leslie S. Miller; John H. Lynn; Albert J. Miller

[57] ABSTRACT

The discharge of a capacitor energizes a relay to actuate the dump valve of a braking system to interrupt braking action upon the occurrence of wheel slide.

24 Claims, 2 Drawing Figures

Fig. 2.

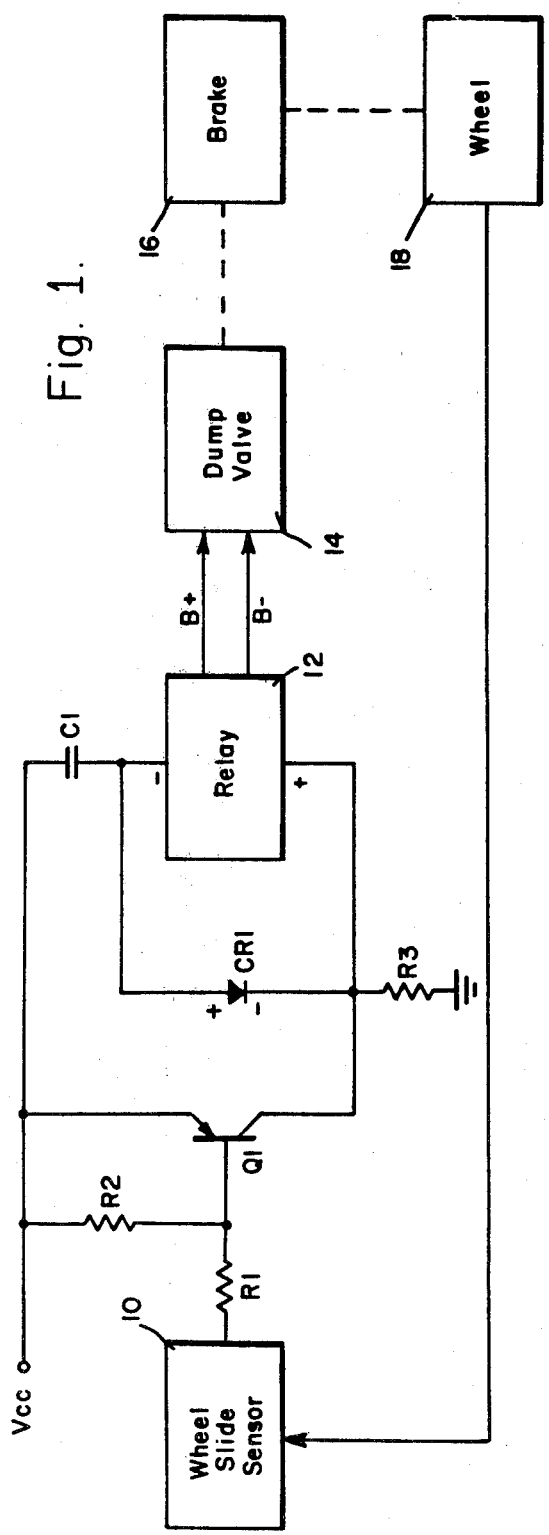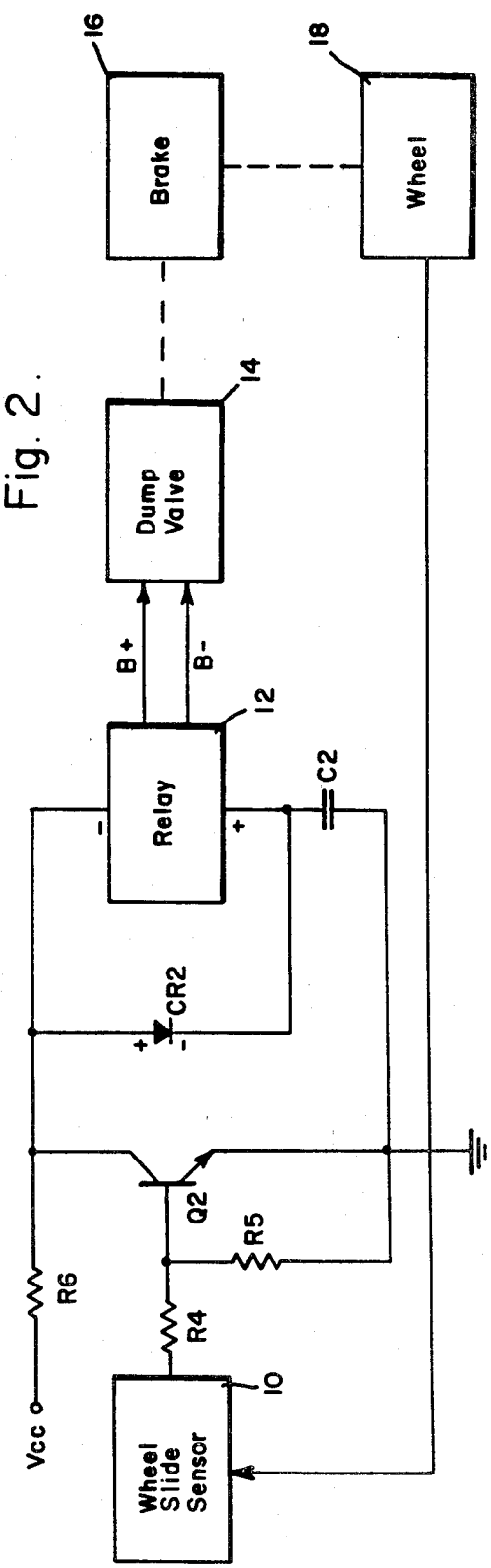

BRAKE CONTROL SYSTEM

BACKGROUND OF THE INVENTION

1. Field of the Invention

The present invention relates to a device for energizing a load connected thereto for a predetermined time. In particular, the present invention relates to devices for actuating dump valves of a friction brake system upon the occurrence of wheel slide in order to correct the slide.

2. Description of the Prior Art

The prevention of wheel slide upon the application of a friction brake is an important safety consideration for many vehicles, particularly rapid transit vehicles. Existing circuits which perform this function utilize redundancy to lower the risk of failure; have complex, expensive circuitry; or utilize devices which have undesirable failure modes.

There is a need in the art for a simple, low-cost, reliable device for actuating the dump valve of a friction brake system to interrupt the braking action of a friction brake with no hazardous failure modes.

SUMMARY OF THE INVENTION

The present invention provides a device which overcomes the difficulties associated with the prior art for actuating the dump valves of a friction brake system upon the occurrence of wheel slide to release the brake to correct the slide. Upon detection of wheel slide, the invention energizes a relay for a time interval equal to the lesser of the duration of the wheel slide or a predetermined maximum time. The relay, when energized, supplies an actuating signal to the dump valves of a braking system for interrupting the braking action thereof. A failure in brake control system according to the present invention causes the relay to deenergize after a predetermined time, permitting resumption of the braking action.

BRIEF DESCRIPTION OF THE DRAWINGS

FIG. 1 is a schematic of a first embodiment of the invention; and

FIG. 2 is a schematic of a second embodiment of the invention.

DESCRIPTION OF THE PREFERRED EMBODIMENT

Referring to FIG. 1, a wheel slide sensor 10 inputs a signal to the base of a transistor $Q_1$ through a resistance $R_1$. A biasing voltage $V_{cc}$ is connected to the emitter of transistor $Q_1$ and to a resistance $R_2$, which is connected to the base of transistor $Q_1$. The collector of transistor $Q_1$ is grounded through a resistance $R_3$.

A capacitance $C_1$ has one terminal connected to $V_{cc}$ and to the emitter of transistor $Q_1$ and a second terminal connected to the anode of a diode $CR_1$ and to a relay 12. Relay 12 is preferably polarity-sensitive to eliminate the failure mode which would result for a non-polarity sensitive relay if diode $CR_1$ opened and capacitor $C_1$ shorted. The negative input terminal of relay 12 is connected to capacitor $C_1$, and the positive input terminal of relay 12 is connected between the collector of transistor $Q_1$ and resistance $R_3$. The cathode of diode $CR_1$ is also connected between the collector of transistor $Q_1$ and resistance $R_3$ to complete the charging circuit for the capacitance $C_1$.

Relay 12 has output terminals B+ and B− which are connected to a load, such as a friction brake dump valve 14. When energized, relay 12 supplies an actuating signal to dump valve 14 for interrupting the braking action of a friction brake 16 which is connected between the dump valve 14 and to a wheel 18.

Wheel slide sensor, which may be an electromagnetic sensor or other suitable transducer, 10 senses whether wheel 18 is sliding and outputs a voltage equal to $V_{cc}$ in the absence of wheel slide so that the emitter and base of transistor $Q_1$ are at the same potential, which causes transistor $Q_1$ to be normally in a non-conducting state. When transistor $Q_1$ is non-conducting, capacitance $C_1$, being connected to $V_{cc}$, charges through diode $CR_1$ and resistance $R_3$ to the potential of $V_{cc}$. When capacitance $C_1$ is charged, there is a small reverse current through relay 12, but since relay 12 and diode $CR_1$ are in parallel, the voltage drop across relay 12 due to the reverse current therethrough is limited to the voltage drop across diode $CR_1$. Relay 12 has a pull-in voltage such that application of a voltage smaller than the pull-in voltage across the input terminals thereof will not energize the relay 12. Therefore, capacitance $C_1$, diode $CR_1$, relay 12, and voltage $V_{cc}$ are chosen such that charging capacitor $C_1$ to the voltage $V_{cc}$ causes a voltage drop across the diode $CR_1$ which is less than the pull-in voltage of the relay 12. Therefore, diode $CR_1$ prevents capacitor $C_1$ from discharging through relay 12 when transistor $Q_1$ is in the non-conducting state; and relay 12 will not energize when capacitance $C_1$ is charged to the potential $V_{cc}$.

The output voltage of wheel slide sensor 10 decreases to ground potential when wheel slide sensor 10 detects the occurrence of wheel slide. Voltage $V_{cc}$ and resistances $R_1$ and $R_2$ are chosen such that, when the output of wheel slide sensor 10 decreases from $V_{cc}$ to ground potential, transistor $Q_1$, switches from the non-conducting state to the conducting state. When the output of wheel slide sensor 10 indicates the presence of wheel slide, transistor $Q_1$ switches from the non-conducting state to the conducting state so that current may flow from the emitter to the collector, thereby forming a discharge path for capacitance $C_1$. When transistor $Q_1$ is conducting, discharge current from capacitance $C_1$ passes through transistor $Q_1$ into the positive terminal of relay 12. Immediately after transistor $Q_1$ switches from the non-conducting state to the conducting state, the potential difference across relay 12 is the potential of $V_{cc}$ minus the saturation voltage of transistor $Q_1$. The pull-in voltage of the relay 12 is less than the voltage across the input terminals thereof; therefore, the voltage applied to relay 12 immediately after transistor $Q_1$ switches from the non-conducting state to the conducting state is sufficient to energize relay 12.

Relay 12 also has a predetermined drop-out voltage such that decreasing the voltage applied across the input terminals thereof below the drop-out voltage causes relay 12 to de-energize, thereby terminating the actuating signal to dump valve 14. Relay 12 remains energized for the lesser of the time interval until transistor $Q_1$ switches from the conducting state to the non-conducting state, thereby indicating no wheel slide, or until capacitance $C_1$ discharges to a potential such that the voltage applied to relay 12 is equal to the drop-out voltage thereof. De-energizing relay 12 permits resumption of the braking action. Therefore, the invention actuates the relay to interrupt the braking action for the duration of a detected wheel slide or for a predetermined maximum time.

FIG. 2 illustrates an embodiment of the invention wherein a transistor $Q_2$ switches from the non-conducting state to the conducting state when the input signal to the base thereof is $V_{cc}$ and from the conducting state to the non-conducting state when the input thereto is at ground potential. Wheel slide sensor 10 is connected to the base of transistor $Q_2$ through a resistance $R_4$; and a resistance $R_5$ is connected between the base of transistor $Q_2$ and ground. The potential $V_{cc}$ is connected through a resistance $R_6$ to the collector of transistor $Q_2$, to the anode of diode $CR_2$, and to the negative input terminal of relay 12. The cathode of diode $CR_2$ and the positive terminal of relay 12 are connected together at a junction 20; and a capacitor $C_2$ has one terminal thereof connected to junction 20 with the other terminal thereof being connected to between resistance $R_5$ and ground and to the emitter of transistor $Q_2$. As in FIG. 1, relay 12 of FIG. 2 actuates dump valve 14, which interrupts the braking action of brake 16 on wheel 18.

When transistor $Q_2$ is non-conducting, current flows through resistance $R_6$ and diode $CR_2$ to charge capacitance $C_2$ to voltage $V_{cc}$. If wheel slide sensor 10 produces an output voltage of zero to indicate no wheel slide, then transistor $Q_2$ is non-conducting; and relay 12 is not energized. Wheel slide sensor 10 produces a voltage $V_{cc}$ to indicate the occurrence of wheel slide; therefore, $R_4$ is chosen such that the wheel slide signal 10 is sufficient to switch transistor $Q_2$ from the non-conducting state to the conducting state. If transistor $Q_2$ switches from the non-conducting state to the conducting state, then capacitance $C_2$ has a discharge path through relay 12 and the collector-emitter junction of transistor $Q_2$.

As in the FIG. 1 embodiment, switching transistor $Q_2$ from the non-conducting state to the conducting state results in the application of a potential difference equal to $V_{cc}$ minus the saturation voltage of transistor $Q_1$ across relay 12, which is sufficient to energize relay 12 if this applied potential difference is greater than the relay pull-in voltage. Relay 12 remains energized to provide an actuating signal to dump valve 14 to interrupt the braking action of brake 16 for a time interval equal to the lesser of the time required for capacitance $C_2$ to discharge to a potential such that the voltage applied to relay 12 is equal to the drop-out voltage thereof or until wheel slide sensor 10 indicates no wheel slide, whereupon transistor $Q_2$ switches to the non-conducting state.

Both of the illustrated embodiments of the invention provide circuitry for energizing relay 12 for a time less than or equal to a predetermined interval. The present invention provides circuitry for energizing relay 12 such that no component failure within the circuitry will cause relay 12 to provide an actuating signal to dump valve 14 for a time greater than a predetermined safe interval.

Although the present invention is described in connection with a braking system, the invention has application in any system where it is necessary to have a safe means of providing a signal for a time interval less than or equal to a predetermined maximum time interval. It will be understood by those skilled in the art that modifications may be made without departing from the scope of the invention. Accordingly, this invention includes all modifications and equivalents which are properly within the scope of the appended claims.

What is claimed is:

1. A system for controlling a dump valve of a braking system on a wheel, comprising:
    a relay having an output connected to the dump valve; and
    means for energizing said relay during an occurrence of wheel slide to provide an actuating signal to the dump valve to prevent braking action on the wheel for the duration of the wheel slide or for a predetermined maximum time if the duration of the wheel slide exceeds said predetermined maximum time.

2. A system according to claim 1, wherein said means for energizing said relay comprises:
    a source of electrical energy;
    a capacitor connected between said source of electrical energy and said relay;
    means for providing a charging path for said capacitor whereby said capacitor receives an electrical charge from said source of electrical energy;
    wheel slide sensor means for providing a wheel slide signal indicative of wheel slide; and
    means, responsive to said wheel slide signal, for discharging said capacitor through said relay to energize said relay.

3. A system according to claim 2 wherein said means for providing a charging path for said capacitor includes a diode connected between said capacitor and ground potential.

4. A system according to claim 1 or claim 3 wherein said relay is a polarity-sensitive relay connected in parallel with said diode in opposing polarity therewith.

5. A system according to claim 4 wherein said means for discharging said capacitor includes switch means for switching between a first state to permit said capacitor to receive an electrical charge from said source of electrical energy when said wheel slide sensor fails to indicate the occurrence of wheel slide and a second state in response to said wheel slide signal to permit said capacitor to discharge through said relay.

6. A system according to claim 5 wherein said switch means comprises a transistor.

7. A system according to claim 2 wherein said predetermined maximum time is the time interval for discharging said capacitor from a first predetermined voltage to a second predetermined voltage.

8. In a braking system including a friction brake for controlling the rotational speed of a wheel and a dump valve for selectively interrupting the braking action of said friction brake, means for controlling wheel slide, comprising:
    a capacitor;
    means for electrically charging said capacitor;
    a relay connected to said capacitor; and
    means for discharging said capacitor through said relay to provide an actuating signal to said dump valve to interrupt the braking action of said friction brake during an occurrence of wheel slide.

9. A system according to claim 8 wherein said means for discharging said capacitor includes:
    switch means for selectively switching between a non-conducting state to charge said capacitor and a conducting state to discharge said capacitor through said relay, thereby energizing said relay to provide said actuating signal; and
    wheel slide sensor means connected to said switch means for sensing the occurrence of wheel slide, said switch means being responsive to said wheel slide sensor means to be in the conducting state only when said wheel slide sensor means indicates the occurrence of wheel slide, said relay being energized for the duration of the wheel slide or for a predetermined maximum time interval if the duration of the wheel slide exceeds said predetermined maximum time interval.

10. A system according to claim 7 or 8 wherein said relay is a polarity-sensitive relay having a positive input terminal and a negative input terminal.

11. Apparatus according to claim 10 wherein said means for electrically charging said capacitor includes:
   a source of electrical energy connected to said capacitor; and
   a diode having an anode and a cathode, said anode being connected to the negative input terminal of said relay, said cathode being connected to the positive input terminal of said relay.

12. A system according to claim 1 wherein said means for energizing said relay comprises:
   a source of electrical energy;
   a diode connected to said source of electrical energy, said diode being connected in parallel with said relay;
   switch means having first, second and third switch terminals, said first switch terminal being connected to said source of electrical energy, said second switch terminal being connected to ground potential;
   a capacitor connected between said second switch terminal and said diode, whereby said source of electrical energy and said diode comprise a charging path for said capacitor; and
   wheel slide sensor means connected to said third switch terminal for providing a wheel slide signal indicative of an occurrence of wheel slide, said switch means being responsive to said wheel slide signal to switch from a non-conducting state for charging said capacitor to a conducting state for discharging said capacitor through said relay, thereby energizing said relay to produce said actuating signal during an occurrence of wheel slide.

13. A system according to claim 12 wherein said relay is a polarity-sensitive relay connected in opposing polarity with said diode.

14. A system according to claim 12 wherein said switch means comprises a transistor.

15. A braking system, comprising:
   a rotatable wheel;
   brake means connected to said rotatable wheel for selectively applying a braking force thereto to control the rotational speed thereof;
   dump valve means connected to said brake means for selectively interrupting the braking force on said rotatable wheel;
   wheel slide sensor means for providing a wheel slide signal which indicates when said rotatable wheel is sliding;
   a polarity-sensitive relay having an output connected to said dump valve;
   means for energizing said relay when said rotatable wheel is sliding to provide an actuating signal to said dump valve to prevent application of the braking force for the duration of the wheel slide or for a predetermined maximum time if the duration of the wheel slide exceeds said predetermined maximum time period.

16. A system according to claim 15, wherein said means for energizing said relay comprises:
   a source of electrical energy;
   a capacitor connected between said source of electrical energy and said relay;
   means for providing a charging path for said capacitor whereby said capacitor receives an electrical charge from said source of electrical energy;
   wheel slide sensor means for providing a wheel slide signal indicative of wheel slide; and
   means, responsive to said wheel slide signal, for discharging said capacitor through said relay to energize said relay.

17. A system according to claim 16 wherein said means for providing a charging path for said capacitor includes a diode connected between said capacitor and ground potential.

18. A system according to claim 17 wherein said relay is connected in parallel with said diode in opposing polarity therewith.

19. A system according to claim 18 wherein said means for discharging said capacitor includes switch means for switching between a first state to permit said capacitor to receive an electrical charge from said source of electrical energy when said wheel slide sensor fails to indicate the occurrence of wheel slide and a second state in response to said wheel slide signal to permit said capacitor to discharge through said relay.

20. A system according to claim 19 wherein said switch means comprises a transistor.

21. A system according to claim 16 wherein said predetermined maximum time is the time interval for discharging said capacitor from a first predetermined voltage to a second predetermined voltage.

22. A device for controlling wheel slide in a braking system for a wheel, comprising:
   means for charging a capacitor from a source of electrical energy;
   means for detecting an occurrence of wheel slide;
   means for discharging the capacitor upon the detection of wheel slide;
   means for energizing a relay with the capacitor discharge current;
   means for actuating a dump valve in the braking system with the output of the relay to prevent braking action on the wheel; and
   means for de-energizing the relay upon termination of wheel slide or after a maximum time determined by the time required to discharge the capacitor from a first predetermined voltage to a second predetermined voltage, thereby permitting braking action on the wheel.

23. A method of controlling wheel slide in a friction braking system for a wheel, comprising the steps of:
   charging a capacitor;
   detecting an occurrence of wheel slide; and
   discharging the capacitor through a relay upon the detection of wheel slide to energize the relay to provide an actuating signal for interrupting braking action on the wheel, the relay being energized for a time equal to the lesser of the duration of wheel slide or a predetermined maximum time interval.

24. A method of controlling wheel slide in a braking system for a wheel, comprising:
   charging a capacitor from a source of electrical energy;
   detecting an occurrence of wheel slide;
   discharging the capacitor upon the detection of wheel slide;

energizing a relay with the capacitor discharge current;

actuating a dump valve in the braking system with the output of the relay to prevent braking action on the wheel; and de-energizing the relay upon termination of wheel slide or after a maximum time determined by the time required to discharge the capacitor from a first predetermined voltage to a second predetermined voltage thereby permitting braking action on the wheel.

* * * * *